United States Patent [19]

Iwai et al.

[11] Patent Number: 5,325,428

[45] Date of Patent: Jun. 28, 1994

[54] AUTOMATIC SWITCHING-BACK DEVICE FOR TELEPHONE CIRCUIT

[76] Inventors: Seizo Iwai; Tsuneko Iwai; Yukiko Iwai, all of 1549, Soja, Soja-Machi, Maebashi-shi, Gunma-Ken, Japan; Yumiko Iwai, 1982, Norborito, Tama-Ku, Kawasaki-shi, Kanagawa-Ken, Japan

[21] Appl. No.: 781,225

[22] PCT Filed: May 2, 1991

[86] PCT No.: PCT/JP91/00602

§ 371 Date: Dec. 31, 1991

§ 102(e) Date: Dec. 31, 1991

[87] PCT Pub. No.: WO91/17619

PCT Pub. Date: Nov. 14, 1991

[30] Foreign Application Priority Data

May 2, 1990 [JP] Japan ............................... 116022

[51] Int. Cl.[5] .......................... H04M 1/00; H04M 3/00
[52] U.S. Cl. .................................. 379/422; 379/250
[58] Field of Search ............... 379/422, 250, 164, 165, 379/100, 93

[56] References Cited

U.S. PATENT DOCUMENTS

| | | | |
|---|---|---|---|
| 4,987,586 | 1/1991 | Gross et al. | 379/98 |
| 5,003,581 | 3/1991 | Pittard | 379/98 |
| 5,048,073 | 9/1991 | Weiser et al. | 379/63 |
| 5,151,972 | 9/1992 | Lorenz et al. | 379/97 |

FOREIGN PATENT DOCUMENTS 61-230556 9/1990 Japan .
2-230849 9/1990 Japan .

*Primary Examiner*—James L. Dwyer
*Assistant Examiner*—Jack Chiang
*Attorney, Agent, or Firm*—Michael N. Meller

[57] ABSTRACT

The communication carried out by an auxiliary terminal machine (AUX) utilizes audio signal wires picked up out of an 8-circuit and 6-contact switch (SW) or an 8-circuit and 3-contact switch (SW). An automatic switching circuit (SS), connected to the audio signal wires containing alternating current and separated from the audio signal wires with direct current, serves to detect the termination of the auxiliary terminal machine and switch back to the normal phone. The energy-saving exchanger supplying only alternating current is allowed to be connected to the auxiliary terminal machine for performing a communication function and then automatically switches back to the normal phone connection when the auxiliary terminal machine terminates the communication.

8 Claims, 2 Drawing Sheets

AUTOMATIC SWITCHING-BACK DEVICE FOR TELEPHONE CIRCUIT

TECHNICAL FIELD

The present invention relates to an automatic switching-back device for a telephone circuit, and more particularly to the automatic switching-back device for a four-wire phone circuit including wires for an audio signal and a control signal and manipulating a control signal containing d.c. components and another control signal not containing d.c. components.

TECHNICAL BACKGROUND

A normal phone device installed in office is connected to four-wire line arrangement including audio signal wires led from an NTT (Nippon Telegram and Telephone Corporation) circuit and wires for transferring control signals between an exchanger and a terminal phone. The four-wire line arrangement has a normalized connector. In actual, however, each manufacturing company has made the corresponding connector providing each arrangement of pin locations, because each manufacturing company may specify a signal for each pin of the connector at its own discretion.

Hence, when any terminal including a phone, a facsimile, and a cordless phone is connected to an already-installed exchanger, an operator cannot grasp which one of the four lines corresponds to audio signals or control signals at a glance and is required to do troublesome operation for specifying it.

In order to overcome the shortcoming, there is provided a phone circuit switching device disclosed in Japanese Patent Application No. Hei 1-42596 (42596/1989), for example. The phone circuit switching device is arranged to use a 8-circuit and 6-contact switch and to switchably connect four wires on the exchanger side to four wires on the phone side through the switch.

This phone circuit switching device is designed to select two wires for audio signals as searching the four wires. Hence, the switching device provides a terminal for picking up an audio signal so that an auxiliary terminal such as a facsimile is switchably connected to the switching device, resulting in allowing a single line to be used for two or more uses.

In case of connecting the auxiliary terminal, when the auxiliary terminal such as a facsimile is stopped, it is desirous to automatically switch back from the facsimile to the phone. The arts disclosed in the Japanese Patent Application Nos. Hei 1-299289 and Hei 1-336916 have been proposed for automatic switching-back operation.

Those automatic switching-back devices are arranged to operate with d.c. power supplied from the control line as a power supply. The energy-saving type exchangers are commercially available so that only alternate current is flown through a control wire without flowing direct current.

Such an automatic switching-back device cannot be applied to those energy-saving type exchangers.

DISCLOSURE OF THE INVENTION

The present invention is designed to overcome the foregoing shortcoming and it is an object of the present invention to provide an automatic switching-back device for a phone circuit which is adapted to even an exchanger not flowing direct current through a control wire.

In carrying out the object in a preferred mode, according to a first aspect of the invention, an automatic switching-back device being adapted to a four-wire phone circuit containing audio signal wires and control signal wires, includes an 8-circuit and 6-contact switch having four circuits on an input side and the other four circuits on an output side, the four circuits on the input side respectively having movable contacts connected to four input wires, the four circuits on the output side respectively having interlocked movable contacts connected to four output wires, six fixed contacts of the four circuits contained in each of the input and output side being connected to select two wires of the four wires in sequence for forming six combinations of the four wires, and picking up input audio wires generally connecting audio signal wires on each of the input-side circuits and output audio wires generally connecting audio signal lines on each of the output-side circuits, and an automatic switching circuit having an input terminal connected to the input audio wires, an output terminal connected to the output audio wires, a control input terminal connected to an auxiliary terminal machine in light of alternate current but separated from the auxiliary terminal machine in light of direct current, and a switching circuit for separating the input terminal from the output terminal and transferring an audio signal between the input terminal and the auxiliary terminal machine when a signal indicating an on state of the auxiliary terminal machine is given to the control input terminal and connecting the input terminal to the output terminal when a signal indicating an off state is given to the control input terminal.

According to a second aspect of the invention, an automatic switching-back device being adapted to a four-wire phone circuit containing audio signal wires and control signal wires, includes an 8-circuit and 3-contact switch having four circuits on an input side and the other four circuits on an output side, the four circuits on the input side respectively having movable contacts connected to four input wires, the four circuits on the output side respectively having interlocked movable contacts connected to four output wires, three fixed contacts of the four circuits contained in each of the input and output side being connected to select two wires of the four wires in sequence for forming three combinations of the four wires, and picking up input audio wires generally connecting audio signal wires on each of the input-side circuits and output audio wires generally connecting audio signal lines on each of the output-side circuits, and an automatic switching circuit having an input terminal connected to the input audio wires, an output terminal connected to the output audio wires, a control input terminal connected to an auxiliary terminal machine in light of alternate current but separated from the auxiliary terminal machine in light of direct current, and a switching circuit for separating the input terminal from the output terminal and transferring an audio signal between the input terminal and the auxiliary terminal machine when a signal indicating an on state of the auxiliary terminal machine is given to the control input terminal and connecting the input terminal to the output terminal when a signal indicating an off-state is given to the control input terminal.

OPERATION

When the 8-circuit and 6-contact switch or the 8-circuit and 3-contact switch is operated in the state that an audio signal such as a time-reporting number "117" is supplied to the four wires from the exchanger, an audio signal can be picked up to the input audio line at any switching location. An ear phone may be connected to the input audio line. Some phones are arranged to activate a light-emitting diode for lighting when they enter into the proper connecting state. For those phones, it is unnecessary to pick up the audio signal. Any exchanger can connect various terminals such as a phone to the two wires for audio signals identified from the four wires led from the exchanger.

The auxiliary terminal is connected to the picked-up audio signal wires for operating the auxiliary terminal for doing communication, on the basis of the following steps. When the auxiliary terminal is switched on, the automatic switching circuit serves to connect the auxiliary terminal to the exchanger in place of the normal terminal (phone, for example). When the auxiliary terminal is switched off, the automatic switching circuit serves to connect the normal terminal to the exchanger in place of the auxiliary terminal.

The automatic switching circuit is separated from the audio signal wires in light of the direct current but is connected to the audio signal wires in light of the alternate current. Hence, the energy-saving exchanger supplying only an a.c. signal is capable of detecting the termination of communication and automatically switching back to the original state based on the detected signal.

EFFECT

According to the present invention, the automatic switching back device is arranged so that the auxiliary terminal is operated for doing communication through the use of the audio signal wires picked up from the 8-circuit and 6-contact switch or the 8-circuit and 3-contact switch and the automatic switching circuit, separated from the audio signal line in light of direct current and connected to the audio signal line in light of alternate current, detects the communication termination of the auxiliary terminal. Hence, the present automatic switching-back device may be connected to the energy-saving type exchanger supplying only the alternate current so that the automatic switching-back device operates to automatically switch back to the original state. That is, the present invention provides an automatic switching-back device for a phone line having unlimited application objects.

DESCRIPTION OF THE PREFERRED EMBODIMENTS

Figure 1:
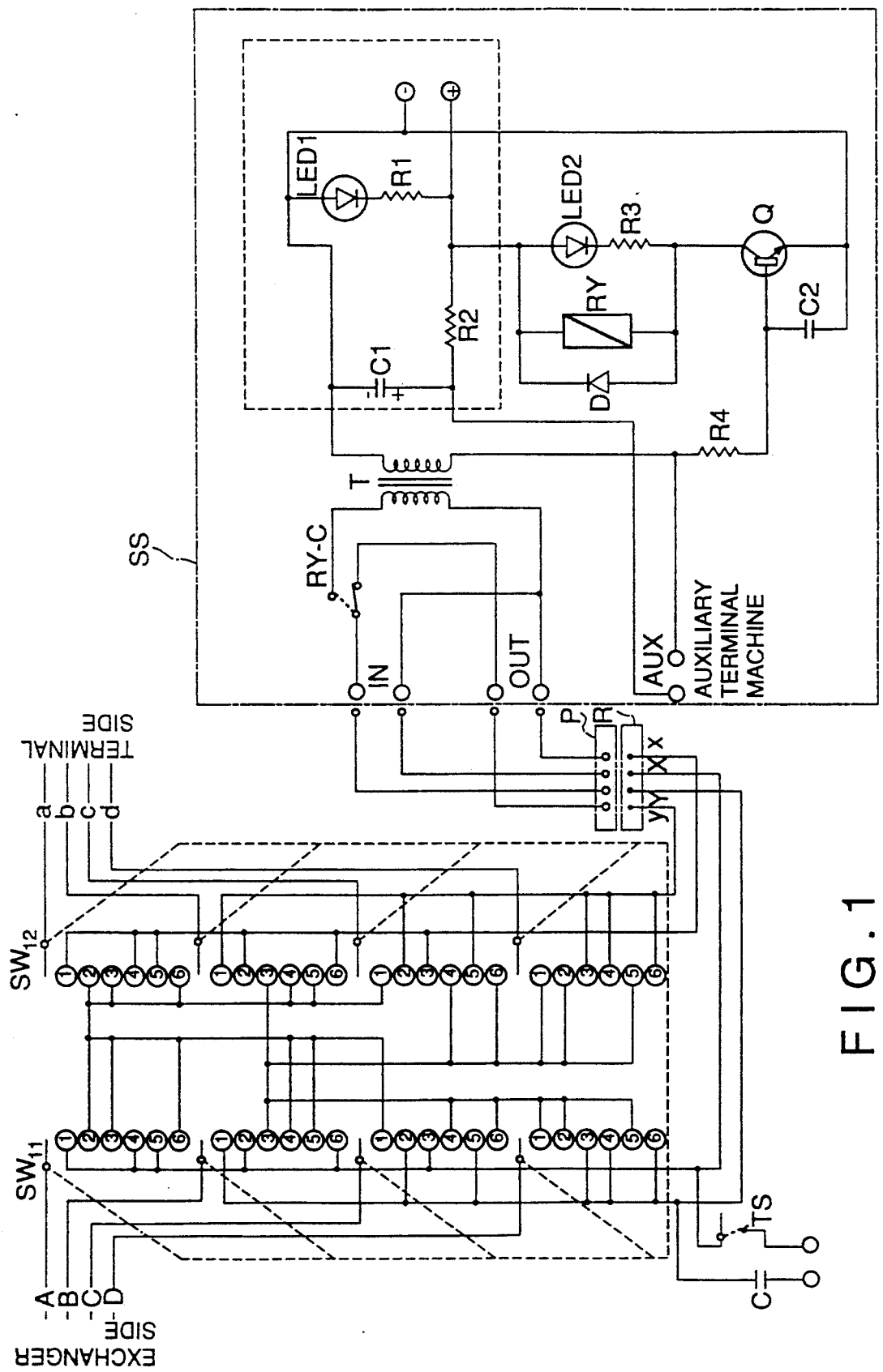
FIG. 1 is a circuit diagram showing an automatic switching-back device according to a first embodiment of the present invention.

FIG. 1 is a circuit diagram showing a first embodiment of the present invention having a phone line switching device and an automatic switching circuit.

The phone line switching device includes a 8-circuit and 6-contact switch circuit composed of SW11 and SW12, each of which corresponds to four circuits on an input side and an output side. The four circuits are referred to as first to fourth switches in sequence from the above. As shown in FIG. 1, the fixed contacts 1, 4, 5 of the first switch, the fixed contacts 2, 6 of the second switch, and the fixed contact 3 of the third switch are mutually connected for composing a first fixed contact group. The fixed contacts 2, 3, 6 of the first switch, the fixed contacts 4, 5 of the second switch, and the fixed contact 1 of the third switch are mutually connected for composing a second fixed contact group. The fixed contact 1 of the second switch, the fixed contacts 2, 5 of the third switch, and the fixed contacts 3, 4, 6 of the fourth switch are mutually connected for composing a third fixed contact group. The fixed contact 3 of the second switch, the fixed contacts 4, 6 of the third switch, and the fixed contacts 1, 2, 5 of the fourth switch are mutually connected for composing a fourth fixed contact group.

The foregoing connecting relations are similarly realized for the input side switch SW11 and the output side switch SW12. The first fixed contact group of the input side switch SW11 is connected to the first fixed contact group of the output side switch SW12 and the fourth fixed contact group of the input side switch SW11 is connected to the fourth fixed contact group of the output side switch SW12.

The first and the third fixed contact groups of the input side switch SW11 are both connected to an earphone terminal through a capacitor C and a tact switch TS. The capacitor C is for inhibiting direct current and the tact switch TS is used for turning on the ear phone when it is pressed.

The first and the third fixed contact groups of the input side switch SW11 are connected to the terminals X and x of a receptacle R. The first and the third fixed contact groups of the output side switch SW12 are connected to the terminals Y and y of the receptacle R.

The terminals X, x, Y, y of the receptacle R are connected to an input terminal IN and an output terminal OUT of an automatic switching circuit SS through a plug P. The input terminal IN and the output terminal OUT are directly connected to each other in case a relay contact RY-c stays as shown in a real line of FIG. 1. In case the relay contact RY-c stays as shown in a dotted line of FIG. 1, the input terminal IN is connected to the output terminal OUT through a transformer T.

Assuming that the terminals X, x and Y, y are mutually connected in the receptacle R, the phone line switching device serves to connect the exchanger to the terminal. In case the relay contact RY-c stays as shown in a real line of FIG. 1, the phone line switching device keeps the exchanger connected to the terminal. In case the relay contact RY-c stays as shown in a dotted line of FIG. 1, the audio signal is passed through the transformer T and is picked out of an auxiliary terminal AUX of the automatic switching circuit SS.

Next, the automatic switching circuit SS is mainly composed of a relay RY and a transistor Q for driving the relay RY. When the auxiliary terminal AUX is closed by the auxiliary terminal device (not shown), a bias voltage is applied to the base of the transistor Q, thereby turning the transistor Q on. The transistor Q serves to activate the relay RY to switch the relay contact RY-c to the dotted-line location.

This automatic switching circuit SS is fed by a power source (not shown) connected to power terminals + and − of the circuit SS. The power is fed to the circuit SS through an LED 1 and a resistor R1 so that the LED 1 is operated to light. The current fed from the power source through a resistor R2 is smoothed by a capacitor C1. That is, the smoothed current is fed to the circuit SS.

The power terminal + is connected to a terminal + of the capacitor C1 through a resistor R2 and connected to auxiliary machine terminals AUX. The power terminal − is connected to a terminal − of the capacitor C1 and is connected to a base of the transistor Q through a secondary winding of a transformer T and a resistor R4.

The base of the transistor Q is grounded to the power terminal − through the capacitor C2. So is the emitter of the transistor Q. The collector of the transistor Q is connected to the power terminal + through a relay coil RY. The relay coil RY is connected in parallel to a surge-suppressing diode D and a series circuit composed of a light-emitting diode LED2 and a current-limiting resistor R3 connected in series.

Assume that a facsimile is connected to the auxiliary machine terminals AUX. The facsimile serves to turn on or off between the auxiliary machine terminals AUX with an internal circuit (not shown) contained in it. In the on state, a bias voltage is applied to the base of the transistor Q so that the transistor Q is in the on state. Hence, the relay RY is activated so that the relay contact RY-c is switched to a dotted-line location.

That is, an audio signal sent from the phone line switching device to the terminal Y of the receptacle R is supplied to the facsimile (not shown) through the transformer T of the automatic switching circuit SS. When the facsimile terminates the communication and is turned off, the application of the bias voltage to the base of the transistor Q is stopped so that the relay RY is deactivated. As a result, the relay contact RY-c is switched back to the real-line location so that the input-side switch SW11 and the output-side switch SW12 of the phone line switching device are directly connected, resulting in releasing the auxiliary terminal machine from between the exchanger and the terminal machine.

When power interruption takes place in the automatic switching circuit SS, the relay RY becomes off, so that the relay contact RY-c is switched back to the real-line location shown in FIG. 1. Hence, the power interruption gives no effect to the phone-line communication of the terminal machine.

Figure 2:
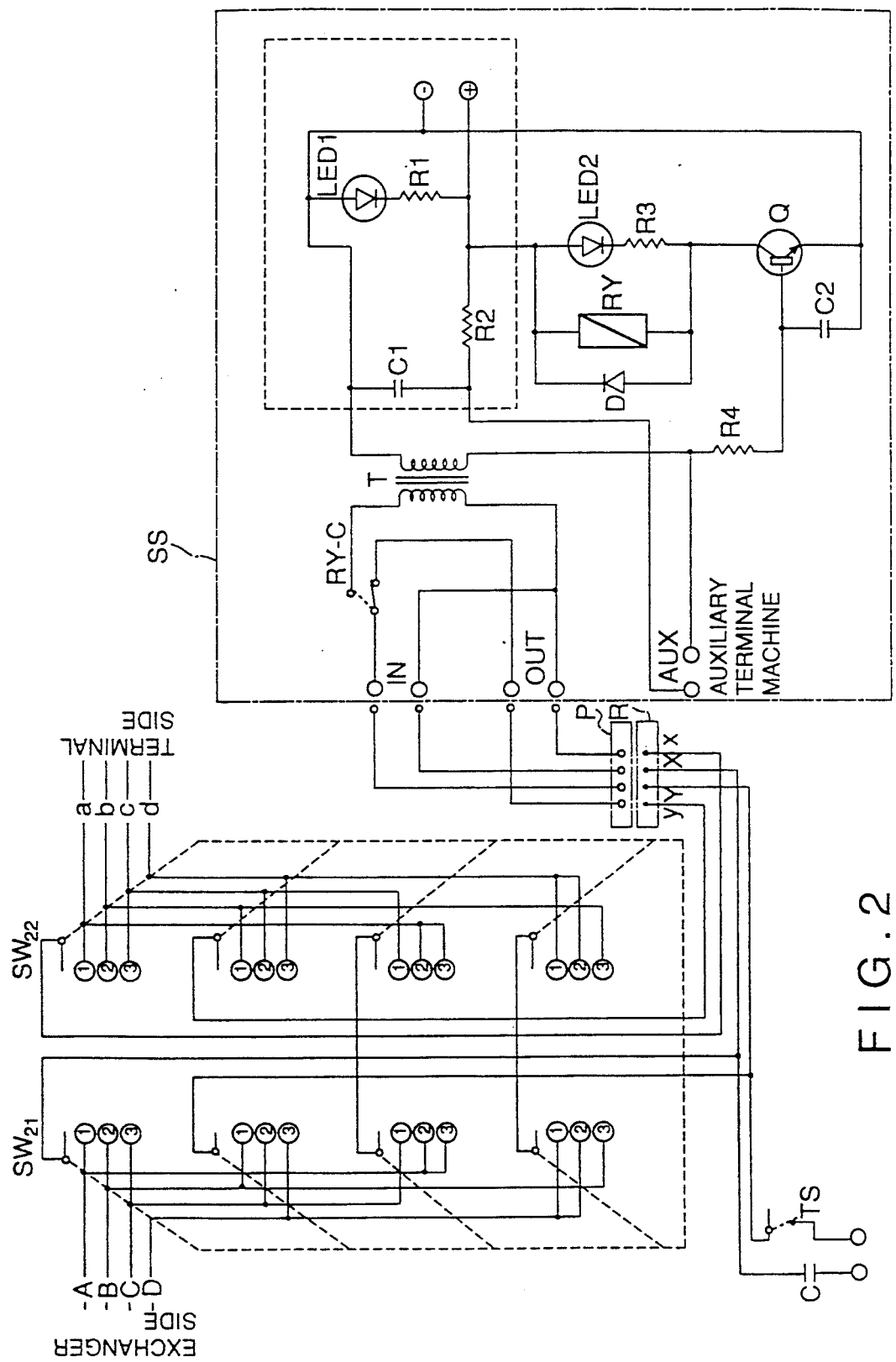
FIG. 2 is a circuit diagram showing an automatic switching-back device according to a second embodiment of the present invention.

FIG. 2 shows a second embodiment of the present invention. The second embodiment has more simplified arrangement of the phone line switching device than that of the first embodiment shown in FIG. 1. That is, in the first embodiment, the audio signal wires of the phone switching device are designed to take the six combinations of A-B, B-C, C-D, A-C, A-D, B-D. On the other hand, the second embodiment shown in FIG. 2 is arranged to have the limited former three combinations. This is because there exist only a few exchangers employing the latter three combinations.

In the second embodiment, an 8-circuit and 3-contact switch is used. The first or the fourth switch composing each four circuits on an input side and an output side is arranged so that the four wires of the exchanger side line are directly connected to the four wires of the terminal side line at each fixed contact and the movable contact is connected to an ear phone terminal and a receptacle R for connecting the auxiliary machine.

In the input-side switch, the fixed contacts 1, 2, 3 of the first switch are respectively connected to the exchanger-side wires A, B, C. The fixed contacts 1, 2, 3 of the second switch are respectively connected to the exchanger-side wires B, C, D. The fixed contacts 1, 2, 3 of the third switch are respectively connected to the exchanger-side wires C, A, A. The fixed contacts 1, 2, 3 of the fourth switch are respectively connected to the exchanger-side wires D, D, A. In the output-side switch, the terminal machine side wires are connected in place of the exchanger-side wires. The movable contacts of the first and the second switches on the input side are connected to the terminals X and Y of the receptacle R and an ear phone terminal. The movable contacts of the first and the second switches on the output side are connected to the terminals x and y of the receptacle R. The movable contacts are connected between the input side and the output side of the third switch and the fourth switch.

The arrangement of the second embodiment except the foregoing connection of the phone line switching device is the same as that of the first embodiment. Hence, the description about the remaining arrangement of the second embodiment will be left out.

INDUSTRIAL UTILIZATION

As has been apparent from the above description, the present invention is applied to the four-wire phone system having a phone exchanger. The invention may be connected to an auxiliary terminal machine such as a facsimile or a TV phone so that after the auxiliary terminal terminates the communication, the line is automatically switched from the auxiliary terminal machine to the normal phone.

What is claimed is:

1. An automatic switching-back device being adapted to a four-wire telephone circuit containing audio signal wires and control signal wires, comprising:

an 8-circuit and 6-contact switching having four circuits on an input side and the other four circuits on an output side, said four circuits on the input side respectively having movable contacts connected to four input wires of said four-wire telephone circuit, said four circuits on the output side respectively having movable contacts interlocked with said movable contacts of said input side and connected to four output wires of said four-wire telephone circuit six fixed contacts of said four circuits contained in each of said input and output side being sequentially connected to two wires at a time of said four input and output wires for forming six combinations of two wires at a time among said four output wires, and picking up input audio wires generally connecting audio signal wires on each of said input-side circuits and output audio wires generally connecting audio signal lines on each of said output-side circuits, and an automatic switching circuit having an input terminal connected to said input audio wire, an output terminal connected to said output audio wires, a control input terminal connected to an auxiliary terminal machine in light of alternate current but separated from said auxiliary terminal machine in light of direct current, and a switching circuit for separating said input terminal from said output terminal and transferring an audio signal between said input terminal and said auxiliary terminal machine when a signal indicating an on-state of said auxiliary terminal machine is given to said control input terminal and connected said input terminal to said output terminal when a signal indicating an off-state is given to said control input terminal.

2. An automatic switching-back device according to claim 1, wherein said switching circuit includes a circuit for detecting an on or off-state of said auxiliary terminal machine and a relay to be activated or deactivated according to an output of the detecting circuit and for switching said input terminal to said output terminal or vice versa.

3. An automatic switching-back device according to claim 1, wherein said switching circuit includes a transformer for separating said control input terminal from said input terminal and output terminal.

4. An automatic switching-back device according to claim 1 further including an ear phone terminal connected to said input audio wires through a switch to be turned on only when the device comes into contact with a direct current screening capacitor.

5. An automatic switching-back device being adapted to a four-wire telephone circuit containing audio signal wires and control signal wires, comprising:

an 8-circuit and 3-contact switch having four circuits on an input side and the other four circuits on an output side, said four circuits on the input side respectively having movable contacts connected to four input wires of said four-wire telephone circuit, said four circuits on the output side respectively having movable contacts interlocked with said movable contacts of said input side and connected to four output wires of said four-wire telephone circuit, three fixed contacts of said four circuits contained in each of said input and output side being sequentially connected to two wires at a time of said four input and output wires for forming three combinations of two wires at a time among said four output wires, and picking up input audio wires generally connected audio signal wires on each of said input-side circuits and output audio wires generally connecting audio signal lines on each of said output-side circuits, and an automatic switching circuit having an input terminal connected to said input audio wires, an output terminal connected to said output audio wires, a control input terminal connected to an auxiliary terminal machine in light of alternate current but separated from said auxiliary terminal machine in light of direct current, and a switching circuit for separating said input terminal from said output terminal and transferring an audio signal between said input terminal and said auxiliary terminal machine when a signal indicating an on-state of said auxiliary terminal machine is given to said control input terminal and connecting said input terminal to said output terminal when a signal indicating an off-state is given to said control input terminal.

6. An automatic switching-back device according to claim 5, wherein said automatic switching circuit includes a circuit for detecting an on or off state of said auxiliary terminal machine and a relay to be activated or deactivated according to the output of said detecting circuit and for switching said input terminal to said output terminal or vice versa.

7. An automatic switching-back device according to claim 5, wherein said automatic switching circuit includes a transformer for separating said control input terminal from said input terminal and output terminal.

8. An automatic switching-back device according to claim 5 including an ear phone terminal connected to said input audio wires through a switch to be turned on only when the device comes into contact with a direct current screening capacitor.

* * * * *